(12) United States Patent
Yamagishi

(10) Patent No.: US 10,381,894 B2
(45) Date of Patent: Aug. 13, 2019

(54) STATOR END COIL RETAINER MEMBER ELASTICALLY PRESS END COIL AGAINST THE STATOR CORE

(71) Applicant: TOYOTA JIDOSHA KABUSHIKI KAISHA, Toyota-shi, Aichi-ken (JP)

(72) Inventor: Yoshitada Yamagishi, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 239 days.

(21) Appl. No.: 15/202,974

(22) Filed: Jul. 6, 2016

(65) Prior Publication Data

US 2017/0012486 A1    Jan. 12, 2017

(30) Foreign Application Priority Data

Jul. 9, 2015    (JP) .................................. 2015-137791

(51) Int. Cl.
*H02K 3/00*    (2006.01)
*H02K 3/52*    (2006.01)
*H02K 5/22*    (2006.01)

(52) U.S. Cl.
CPC ............. *H02K 3/522* (2013.01); *H02K 5/225* (2013.01)

(58) Field of Classification Search
CPC ............ H02K 5/22; H02K 5/225; H02K 3/50; H02K 3/522; H02K 3/52; H02K 3/521; H02K 3/30; H02K 3/0025; H02K 3/0037; H02K 3/0043; H02K 15/0025; H02K 15/0037; H02K 15/0043

USPC .............. 310/71, 216.113, 216.114, 216.118, 310/216.131, 216.135, 416, 254.1, 260, 310/270, 261.1, 43, 194

See application file for complete search history.

(56) References Cited

U.S. PATENT DOCUMENTS

| | | | | |
|---|---|---|---|---|
| 1,728,817 A | * | 9/1929 | Wood ........................ | H02K 5/15 310/260 |
| 2,064,090 A | * | 12/1936 | Sullivan .................. | H02K 17/10 310/172 |
| 2,465,820 A | * | 3/1949 | Sharrow ................. | H02K 3/487 24/16 R |
| 2,575,115 A | * | 11/1951 | Linke ....................... | H02K 3/50 24/122.6 |

(Continued)

FOREIGN PATENT DOCUMENTS

| CN | 1420596 A | 5/2003 |
|---|---|---|
| CN | 101557133 A | 10/2009 |

(Continued)

*Primary Examiner* — Julio C. Gonzalez
*Assistant Examiner* — Maged M Almawri
(74) *Attorney, Agent, or Firm* — Sughrue Mion, PLLC

(57) ABSTRACT

A rotary electric machine stator includes a stator core including a plurality of teeth, a coil wound around the teeth, a power wire being drawn out from the coil, and a retainer member that presses the coil end against the stator core. The retainer member includes a pressing portion disposed on an end surface in an axis direction of the coil end, leg portions extending from respective end portions on opposite sides of the pressing portion toward respective attachment portions provided at the stator core, and attachment ends provided at the respective leg portions and fixed to the respective attachment portions, and the power wire is drawn out from between the leg portions on the opposite sides of the pressing portion.

11 Claims, 4 Drawing Sheets

(56) References Cited

U.S. PATENT DOCUMENTS

| | | | | |
|---|---|---|---|---|
| 2,683,233 A * | 7/1954 | Ruhl | .................. | H02K 3/51 29/598 |
| 3,822,391 A * | 7/1974 | Brown | .................. | H02K 3/522 310/194 |
| RE28,831 E * | 5/1976 | Brown | .................. | H02K 3/522 310/194 |
| 4,217,514 A * | 8/1980 | Simazaki | .................. | H02K 3/50 310/194 |
| 4,469,967 A * | 9/1984 | Grierson | .................. | H02K 3/522 310/194 |
| 4,926,075 A * | 5/1990 | Fushiya | .................. | H01R 39/36 29/596 |
| 5,099,568 A * | 3/1992 | Santandrea | .................. | H02K 3/522 29/596 |
| 5,239,743 A * | 8/1993 | Santandrea | .................. | H02K 3/522 29/596 |
| 5,331,240 A * | 7/1994 | Hyodo | .................. | H02K 3/522 310/260 |
| 6,429,557 B2 * | 8/2002 | Sheeran | .................. | H02K 3/50 310/270 |
| 7,633,198 B2 * | 12/2009 | Kirkman | .................. | H02K 11/046 310/71 |
| 8,022,592 B2 * | 9/2011 | Kaneiwa | .................. | H02K 3/50 310/214 |
| 9,614,404 B2 * | 4/2017 | Takano | .................. | H02K 3/38 |
| 9,787,155 B2 * | 10/2017 | Portner | .................. | H02K 3/28 |
| 2009/0096313 A1 * | 4/2009 | Harada | .................. | H02K 3/522 310/201 |
| 2009/0212654 A1 | 8/2009 | Kaneiwa | | |
| 2010/0264757 A1 * | 10/2010 | Asou | .................. | H02K 3/12 310/43 |
| 2012/0070321 A1 * | 3/2012 | Cho | .................. | F04B 35/04 417/410.1 |
| 2014/0152128 A1 * | 6/2014 | Takano | .................. | H02K 3/38 310/43 |
| 2015/0229178 A1 * | 8/2015 | Murakami | .................. | H02K 3/50 310/71 |

FOREIGN PATENT DOCUMENTS

| | | | |
|---|---|---|---|
| GB | 965984 | * | 8/1964 |
| JP | 2013-074644 A | | 4/2013 |
| JP | 2013-126329 A | | 6/2013 |

* cited by examiner

STATOR END COIL RETAINER MEMBER ELASTICALLY PRESS END COIL AGAINST THE STATOR CORE

INCORPORATION BY REFERENCE

The disclosure of Japanese Patent Application No. 2015-137791 filed on Jul. 9, 2015 including the specification, drawings and abstract is incorporated herein by reference in its entirety.

BACKGROUND

1. Technical Field

The present disclosure relates to a rotary electric machine stator, and specifically relates to a rotary electric machine stator in which a power wire is drawn out from a coil end.

2. Description of Related Art

Japanese Patent Application Publication No. 2013-126329 discloses that insulation between a motor case and a bus bar module from which power wires are drawn out is ensured by an insulation cover covering the bus bar module, at a coil end of a rotary electric machine stator.

Japanese Patent Application Publication No. 2013-074644 described that in a stator for a motor to be used in an electric vacuum cleaner, a part of an end portion in an axis direction of a resin retainer disposed on the inner peripheral side of a coil winding is folded back in a tongue-like shape and thereby holds an end portion in the axis direction of the coil winding.

SUMMARY

Rotary electric machines and the like installed in vehicles are sometimes used under harsh vibration conditions. Upon vibration of a coil wound around a stator core, the load of repeated vibration is applied to, e.g., roots of power wires drawn out from a coil end.

In view of the aforementioned circumstances, the present disclosure provides a rotary electric machine stator that enables suppression of vibration of a coil end relative to a stator core.

Therefore, an aspect of the present disclosure provides a rotary electric machine stator including a stator core, a coil and a retainer member. The stator core includes an annular stator yoke and a plurality of teeth protruding inward from the stator yoke. The coil is wound from the teeth and a power wire is drawn out from the coil. The retainer member is configured to press a coil end against the stator core, the coil end being a part of the coil, the part protruding from an end portion an axis direction of the stator core. The retainer member includes a pressing portion, leg portions and attachment ends. The pressing portion is disposed on an end surface in the axis direction of the coil end and configured to press the coil end to the stator core side. The leg portions bending along the axis direction on an outer peripheral surface side of the coil end from respective end portions on opposite sides of the pressing portion and extending toward respective attachment portions provided at the stator core. The attachment ends are provided at the respective leg portions and fixed to the respective attachment portions of the stator core. The power wire is drawn out from between the leg portions on the opposite sides of the pressing portion.

According to the rotary electric machine stator having such configuration as above, the retainer member including a pressing portion, leg portions extending from end portions on opposite sides of the pressing portion and attachment ends provided at the respective leg portions presses the coil end against the stator core. Here, the power wire is drawn out from between the leg portions on the opposite sides of the pressing portion. As described above, the coil end is pressed against the stator core by the pressing portion with the opposite ends fixed, and thus vibration of the coil end relative to the stator core is suppressed and load of the vibration on the power wire is thereby reduced.

Also, in the rotary electric machine stator, the retainer member may be configured to: (i) make each of the attachment ends be fixed to the stator yoke, causing the retainer member between the fixed attachment ends to elastically deform, and (ii) press the coil end against the stator core via elastic resilience of the retainer member. As described above, the coil end is pressed to the stator core side using elastic resilience of the retainer member, and no special pressing force generation mechanism is provided.

Also, in the rotary electric machine stator, the retainer member may be an insulating resin member. Also, in the rotary electric machine stator, the attachment portions may each include a through-hole and include a metal member having a stiffness that is higher than a stiffness of the resin member. The retainer member including a resin can ensure insulation from the coil end. Also, fixing the retainer member to the stator core, which is a magnetic body, via the attachment portions, which are metal members can ensure a fixing force.

Also, in the rotary electric machine stator, the retainer member may include attachment ends attached to three or more the attachment portions provided at the stator core. As described above, increase in number of attachment portions can ensure provision of a necessary pressing force.

Also, in the rotary electric machine stator, the retainer member may include a joined pressing portion, and the leg portions and the attachment ends. The number of the leg portions is three, and the number of the attachment ends is three. The joined pressing portion may include three joining portions that are provided by mutually connecting the three pressing portions. The three leg portions may extend, with the three joining portions as the three end portions, from the three end portions toward the three attachment portions provided at the stator core, respectively. The three attachment ends may be provided at the three leg portions, respectively. In order to fix the rotary electric machine to, e.g., a motor case, at least three attachment portions may be provided at the stator core. Such configuration as above can ensure provision of a necessary pressing force using making the most of the three attachment portions.

Furthermore, in the rotary electric machine stator, the retainer member and the coil end may be fixed to each other via varnish. Consequently, the retainer member fixed via varnish enables more reliable suppression of vibration of the coil end.

An embodiment of the present disclosure enables suppression of vibration of a coil end relative to a stator core.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
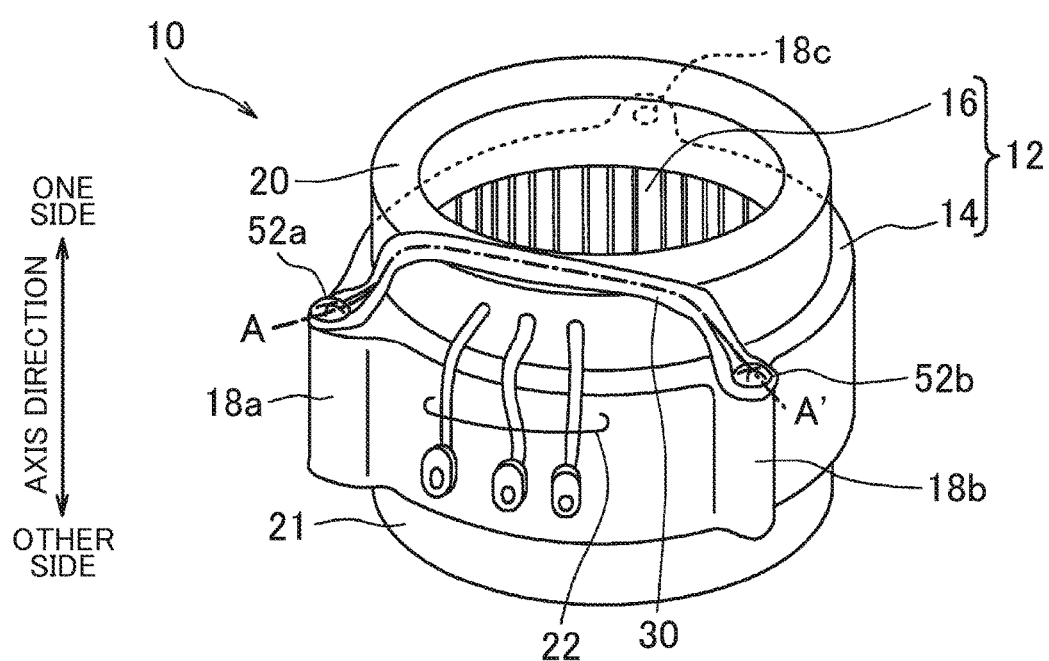
FIG. 1 is a perspective view of a rotary electric machine stator according to an embodiment as an example of the present disclosure.

An embodiment of the present disclosure will be described in detail below with reference to the drawings. The below description will be provided on a stator for a rotary electric machine to be installed in a vehicle, which is, however, is an example for description, and the stator may be any stator for a rotary electric machine that may be subjected to external vibration, other than those to be installed in vehicles. The materials, etc., mentioned below are examples for description and can arbitrarily be changed according to the specifications of the rotary electric machine stator. In the below, through all the drawings, components that are similar to each other will be provided with a same reference numeral, and overlapping description thereof will be omitted.

FIG. 1 is a perspective view of a rotary electric machine stator 10. In the below, unless otherwise mentioned, the rotary electric machine stator 10 is referred to as "stator 10". A rotary electric machine using a stator 10 is a motor/generator installed in a vehicle, the motor/generator functioning as a motor when the vehicle moves and functioning as a power generator when the vehicle is braked, and is a three-phase rotary electric machine. The rotary electric machine include includes a stator 10, and a rotor, which is not illustrated in FIG. 1, disposed on the inner peripheral side of the stator 10 with a predetermined gap therebetween.

The stator 10 includes a stator core 12 and a coil wound around the stator core 12. The stator core 12 includes an annular stator yoke 14 and a plurality of teeth 16 protruding inward from the stator yoke 14. The coil is a winding wound around the teeth, and in FIG. 1, coil ends 20, 21, which are parts of the coil protruding from respective end portions in an axis direction of the stator core 12, are illustrated. A part of the teeth 16 protruding inward from the stator yoke 14 is hidden behind the coil end 20, and in FIG. 1, an inner peripheral surface protruding inward in the form of the teeth 16 is illustrated. The axis direction is indicated in FIG. 1. The coil end 20 is a coil part protruding from an end portion on one side in the axial direction of the stator core 12, and the coil end 21 is a coil part protruding from an end portion on the other side in the axial direction of the stator core 12.

Figure 2:
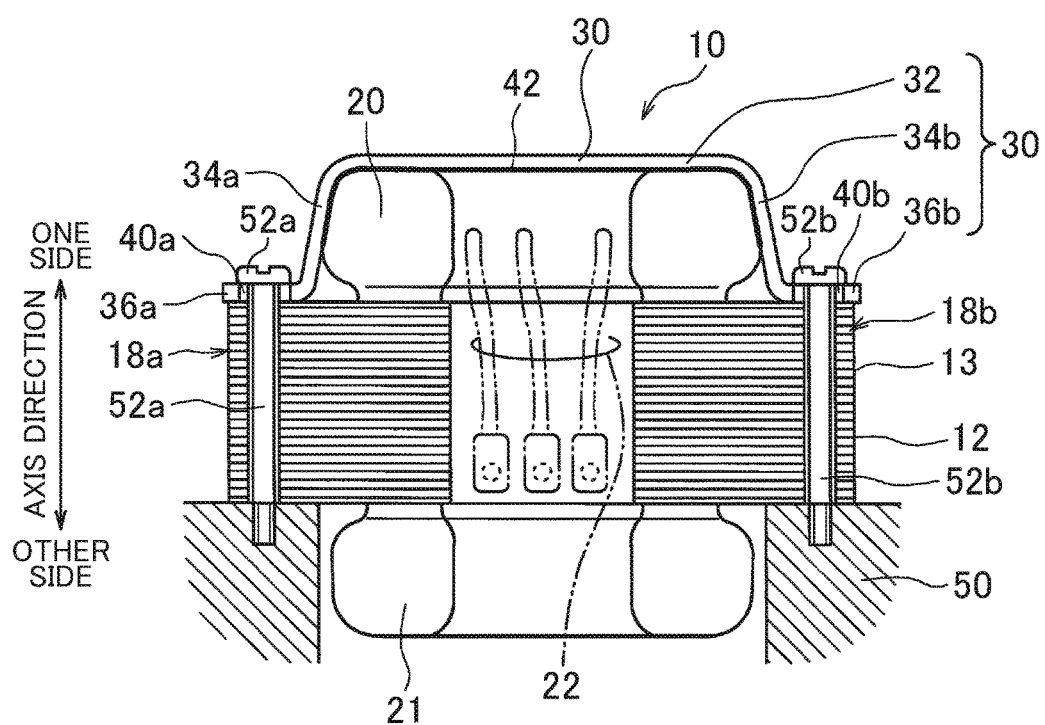
FIG. 2 is a sectional view along line A-A' in FIG. 1.

The stator core 12 is an annular magnetic component formed by stacking a plurality of magnetic thin plates 13 formed in a predetermined shape (see FIG. 2). For the magnetic thin plates, electromagnetic steel plates can be used. Instead of the stack of magnetic thin plates, a single molding of magnetic power may be used.

Power wires 22 are three lead wires one sides of which are connected to three lead terminals, respectively. The three lead terminals are an external lead terminal for a U-phase winding, an external lead terminal for a V-phase winding and an external lead terminal for a W-phase winding, the U-phase, V-phase and W-phase windings being wound around the teeth 16. Here, a terminal on the other side of the U-phase winding, a terminal on the other side of the V-phase winding and a terminal on the other side of the W-phase winding are mutually connected and thereby form a neutral wire. In FIG. 1, as the power wires 22, three lead wires, that is, a U-phase lead wire, a V-phase lead wire and a W-phase lead wire are illustrated. In the power wires 22, terminal plates are attached to the other sides of the three lead wires, that is, the U-phase lead wire, the V-phase lead wire and the W-phase lead wire, respectively. The terminal plates are connected to three phase output terminals of a non-illustrated drive circuit, respectively. The terminal plates may be collected in a terminal block.

The retainer member 30 in FIG. 1 is a member that presses the coil end 20 against the stator core 12. The retainer member 30 is disposed on an end surface in the axis direction of the coil end 20, and opposite ends of the retainer member 30 are fixed to attachment portions 18a, 18b of the stator core 12 via attachment bolts 52a, 52b, respectively. The attachment portions 18a, 18b of the stator core 12 are overhang portions overhanging from an outer peripheral portion of the stator core 12 and each including a through-hole therein, and are used for attaching the rotary electric machine to a motor case 50 (see FIG. 2). In the stator core 12, another attachment portion 18c, which is hidden behind the coil end 20 in FIG. 1, is provided, and the stator 10 is fixedly attached to the motor case 50 using a total of three attachment portions 18a, 18b, 18c.

The retainer member 30 is disposed so as to press a part of the annular coil end 20 from which the power wires 22 are drawn out against the stator core 12. The retainer member 30 is disposed so that the power wires 22 are located between opposite ends of a part of the retainer member 30, the part being disposed on the end surface in the axis direction of the coil end 20. In other words, the retainer member 30 is disposed on the coil end 20 so as to extend over the power wires 22.

Upon, e.g., the rotary electric machine being subjected to external vibration, the stator core 12 vibrates and along with the vibration, the coil end 20 vibrates relative to the stator core 12 and a load applied to, e.g., roots of the power wire 22 increases. The retainer member 30 presses the coil end 20 to the stator core 12 side and thereby serves to suppress vibration of the coil end 20 relative to the stator core 12.

FIG. 2 is a sectional view in line A-A' along the retainer member 30 in FIG. 1. The retainer member 30 includes a pressing portion 32, leg portions 34a, 34b extending from respective end portions on opposite sides of the pressing portion 32, and attachment ends 36a, 36b provided at the respective leg portions 34a, 34b. The power wires 22, which are indicated by alternate long and two short dashes lines in FIG. 2, are drawn out from between the leg portions 34a, 34b on the opposite sides of the pressing portion 32.

The pressing portion 32 is a flat plate-shaped member that is disposed on the end surface in the axis direction of the coil end 20 and presses the coil end 20 to the stator core 12 side. The leg portions 34a, 34b are parts bending along the axis direction on the outer peripheral surface side of the coil end 20 from the respective end portions on the opposite sides of the pressing portion 32 and extending toward the respective attachment portions 18a, 18b provided at the stator core 12. The attachment ends 36a, 36b are respective distal end portions of the leg portions 34a, 34b. The pressing portion 32, the two leg portions 34a, 34b and the two attachment ends 36a, 36b are integrated, and are arranged in the order of the attachment end 36a, the leg portion 34a, the pressing portion 32, the leg portion 34b and the attachment end 36b along line A-A'.

The washer portions 40a, 40b are metal members provided at respective distal end portions of the two attachment ends 36a, 36b and each including a through-hole. An inner diameter of the through-holes is set to be larger than an outer diameter of thread portions of the attachment bolts 52a, 52b. For a material of the washer portions 40a, 40b, a metal having a stiffness that is higher than that of a resin member included in the retainer member 30, and an adequate strength, for example, iron can be used.

For the retainer member 30, a molding formed in a predetermined shape using a resin can be used. For the resin, a material having an electrical insulation property, adequate strength and heat resistance is used. For example, any of epoxy resin, polyimide resin, aromatic nylon resin compounds is used. The resin may contain a proper filler. The washer portions 40a, 40b are formed integrally with the molding at the time of resin molding by a method such as insert molding. Also, for the washer portions 40a, 40b, separate members that are not formed integrally with the molding but are separated from the resin molding may be used. Also, instead of the resin, the retainer member may be formed using a proper metal. In such case, the washer portions may be omitted.

The motor case 50 is a case body that receives the rotary electric machine inside. The attachment bolts 52a, 52b are fastening means for attaching the stator 10 to the motor case 50 and are headed bolts each including a thread portion on the distal end side thereof. As described with reference to FIG. 1, three attachment portions 18a, 18b, 18c are provided in the stator 10, and in the motor case 50, three attachment thread holes are provided for the respective attachment portions 18a, 18b, 18c. A method for attaching the stator 10 to the motor case 50 together with the retainer member 30 will be described below. As described later, because the retainer member elastically deforms as a result of being attached to the stator core 12, the retainer member before attachment to the stator core 12 and the retainer member after attachment to the stator core 12 can be distinguished from each other; however, no such distinction is made and the below description will be provided using "retainer member 30".

The stator 10 is placed on the motor case 50 with the through-holes provided in the respective attachment portions 18a, 18b, 18c positioned on the corresponding three attachment thread holes in the motor case 50. With the retainer member 30 disposed on the end surface on the axis direction of the coil end 20, the through-holes of the washer portions 40a, 40b at two attachment ends 36a, 36b at the distal ends of the two leg portion 34a, 34b are aligned with the through-holes of the attachment portion 18a, 18b of the stator 10, respectively. Next, predetermined three headed bolts are prepared. Two of the headed bolts are used as the attachment bolts 52a, 52b, which are inserted through the through-holes of the washer portions 40a, 40b of the retainer member 30 and the through-holes of the attachment portions 18a, 18b of the stator 10 and screwed into the attachment thread holes of the motor case 50. Consequently, the retainer member 30 is fixed to the attachment portions 18a, 18b of the stator core 12. The remaining one headed bolt is inserted through the through-hole of the attachment portion 18c of the stator 10 and a thread potion at a distal end thereof is screwed into the corresponding attachment thread hole of the motor case 50 and thereby fixed.

The three attachment portions 18a, 18b, 18c of the stator core 12 and the corresponding three headed bolts are intended to fix the stator 10 to the motor case 50; however, two of the attachment portions and two of the headed bolts are used for fixing the retainer member 30 to the stator core 12. Consequently, the retainer member 30 can be attached to the stator core 12 without provision of special fastening means, and the coil end 20 can be pressed against the stator core 12 by the retainer member 30. As a result of the retainer member 30 pressing the coil end 20 against the stator core 12, vibration of the coil end 20 can be suppressed.

Varnish 42 in FIG. 2 is a bonding/fixing material provided by being dropped or applied into between the retainer member 30 and the coil end 20. Consequently, the retainer member 30 fixed using the varnish 42 enables more reliable suppression of vibration of the coil end 20.

Figures 3A, 3B:
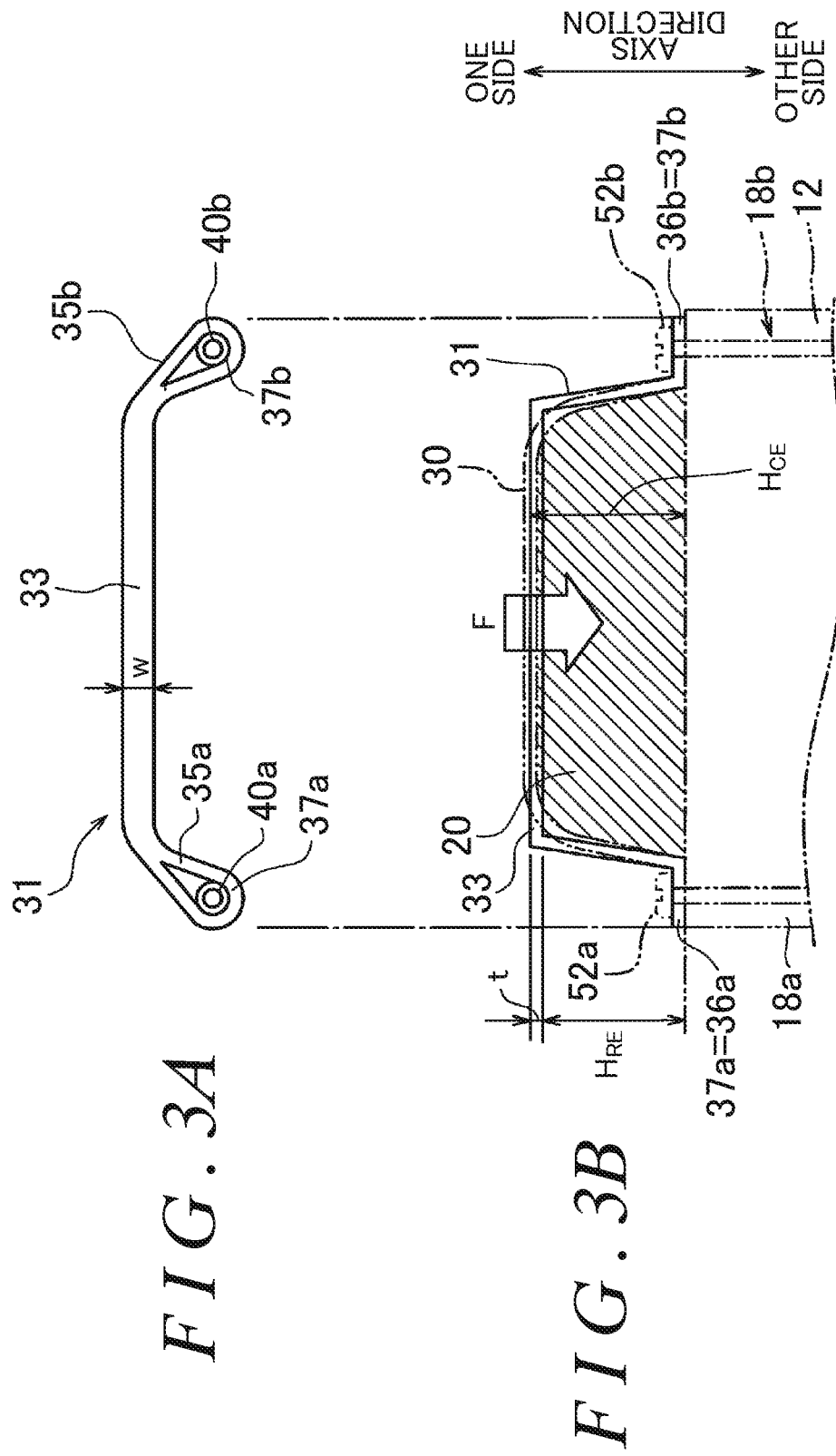
FIG. 3A is a diagram of a retainer member in the rotary electric machine stator according to the embodiment and is a plan view of the retainer member before attachment to a stator core.
FIG. 3B is a diagram illustrating the retainer member in the rotary electric machine stator according to the embodiment and is a diagram illustrating the retainer member before attachment to the stator core and the retainer member attached to the stator core in comparison with each other.

FIGS. 3A and 3B are diagram illustrating a retainer member on the stator core 12. FIG. 3A is a plan view of the retainer member 31 before attachment to the stator core 12, and FIG. 3B is a diagram illustrating a retainer member 31 before attachment to the stator core 12 and a retainer member 31 attached to the stator core 12 in comparison with each other. In FIGS. 3A and 3B, the retainer member before attachment to the stator core 12 and the retainer member after attachment to retainer member are distinguished from each other, and the retainer member before attachment to the stator core 12 is indicated as retainer member 31, the reference numeral of which is incremented by one from that of the retainer member 30 after attachment to the stator core 12.

As illustrated in FIG. 3A, the retainer member 31 before attachment to the stator core 12 includes a pressing portion 33, leg portions 35a, 35b extending from respective end portions on the opposite sides of the pressing portion 33, and attachment ends 37a, 37b provided at the respective leg portions 35a, 35b. Washer portions 40a, 40b are provided in an integrated manner at the respective attachment ends 37a, 37b via insert molding. The leg portions 35a, 35b each have a forked shape so as to tuck in the respective washer portions 40a, 40b provided at the attachment ends 37a, 37b.

In FIG. 3B, the retainer member 30 attached to the stator core 12, the coil end 20 and the stator core 12 are indicated by alternate long and two short dashes lines. A height $H_{RE}$ from a lower surface of the attachment end 37a to a lower surface of the pressing portion 33 of the retainer member 31 before attachment to the stator core 12 is set to be lower than a height $H_{CE}$ from an end surface on one side in the axis direction of the stator core 12 to the end surface in the axis direction of the coil end 20.

Here, the retainer member 31 is disposed on the end surface on the axis direction of the coil end 20, and is fixed to the stator core 12 via the attachment bolts 52a, 52b with the attachment ends 37a, 37b aligned with the attachment portions 18a, 18b of the stator core 12. As a result of the fixing, the retainer member 31 elastically deforms so as to eliminate the height difference ($H_{CE}$-$H_{RE}$), and thereby turns into the retainer member 30. Elastic resilience F generated by elastic deformation of a part of the retainer member 31 between the attachment ends 37a, 37b, which are fixed ends, causes the coil end 20 to be pressed against the stator core 12. The magnitude of the elastic resilience F can be set according to the height difference ($H_{CE}$-$H_{RE}$) and the stiffness of the retainer member 31. The stiffness of the retainer member 31 can be set according to, e.g., elasticity characteristics of the resin material, a width dimension W and a thickness dimension t of the pressing portion 33 and the forked shape of the leg portions 35a, 35b.

Since the washer portions 40a, 40b, which are metal members each including a through-hole, are provided in the attachment ends 37a, 37b, even if the retainer member 31 is formed of a resin, the retainer member 31 can be reliably fixed to the stator core 12 without deformation due to a fastening force of the attachment bolts 52a, 52b. As described above, the retainer member 30 can ensure insulation from the coil end 20 as a result of retainer member 30 including a resin and also ensure provision of a fixing force as a result of the retainer member 30 being fixed to the stator core 12, which is a magnetic metal, via the washer portions 40a, 40b, which are metal members.

The above description has been provided in terms of a case where the retainer member 30 is attached to the stator core 12 using two of the three attachment portions 18a, 18b, 18c. In this case, the opposite ends of the retainer member 30 are fixed ends. The retainer member is not limited to one including two fixed ends and may be one including three or more fixed ends. In other words, the retainer member may be a retainer member including three or more attachment ends to be attached respectively to three or more attachment portions provided at the stator core 12.

Figure 4:
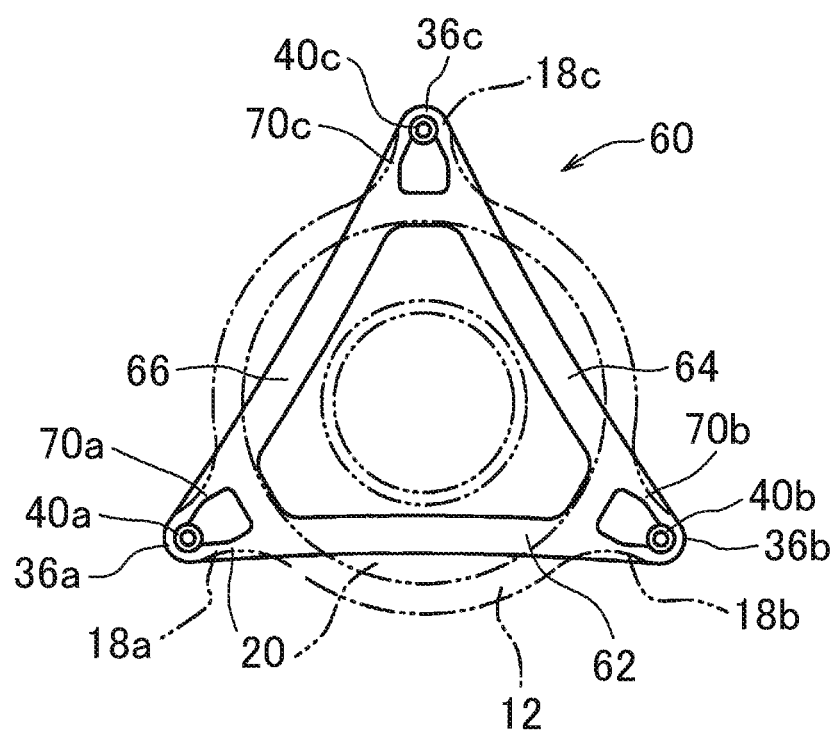
FIG. 4 is a diagram illustrating an alteration of the retainer member in the rotary electric machine stator according to embodiment.

FIG. 4 is a diagram illustrating an example of a retainer member 60 including three fixed ends. FIG. 4 includes a plan view of the retainer member 60 and illustrates a stator core 12 and a coil end 20 indicated by alternate long and two short dashes lines.

The retainer member 60 includes a delta-shape joined pressing portion formed by mutually joining three pressing portions 62, 64, 66. In the retainer member 60, three joining portions via which the three pressing portions 62, 64, 66 are joined to one another correspond to the end portions described with reference to FIGS. 1 and 2. In other words, the retainer member 60 includes three end portions at the delta-shape joined pressing portion. Respective parts extending from the three end portions toward three attachment portions 18a, 18b, 18c provided at the stator core 12 correspond to the leg portions described with reference to FIGS. 1 and 2. In other words, the retainer member 60 includes three leg portions 70a, 70b, 70c.

Distal ends of the three leg portions 70a, 70b, 70c are attachment ends 36a, 36b, 36c, respectively. The three attachment ends 36a, 36b, 36c are the same as the attachment ends 36a, 36b described with reference to FIGS. 1 and 2, and is different from the attachment ends 36a, 36b only in that the number of attachment ends is changed from two to three. At the three attachment ends 36a, 36b, 36c, respective washer portions 40a, 40b, 40c are provided. The washer portions 40a, 40b, 40c are the same as the washer portions 40a, 40b described with reference to FIGS. 1 to 3 and is different from the washer portions 40a, 40b only in that the number of washer portions is changed from two to three. The three leg portions 70a, 70b, 70c each have a forked shape so as to tuck the corresponding washer portions 40a, 40b, 40c in, respectively.

Where the three attachment portion 18a, 18b, 18c of the stator core 12 are disposed equally circumferentially, an angle between two attachment portions with reference to the center axis of the stator is 120 degrees. If positions of three lead wires of power wires 22 drawn out from the coil end 20 fall within the range of the angle of 120 degrees between the two attachment portions, the single retainer member 30 described with reference to FIGS. 1 and 2 can be used. Depending on specifications of the stator 10, if one of positions of the three lead wires of the power wires 22 falls outside the range of the angle of 120 degrees between two attachment portions, the retainer member 60 in FIG. 4 can be used. Use of the retainer member 60 in FIG. 4 enables a part of the coil end 20 from which three lead wires of the power wires 22 are drawn out to be pressed against the stator core 12. Consequently, e.g., when the rotary electric machine is subjected to external vibration, even if the stator core 12 vibrates, vibration of the coil end 20 relative to the stator core 12 is suppressed, enabling reduction in load applied to, e.g., roots of respective lead wires included in the power wires 22.

In the above description, the power wires 22 are drawn out not from the coil end 21, but only from the coil end 20. Depending on specifications of the stator 10, if the power wires are drawn out from each of the coil ends 20, 21, the retainer member may be provided not only on the coil end 20 side, but also on the coil end 21 side.

What is claimed is:

1. A rotary electric machine stator comprising:
    a stator core including an annular stator yoke and a plurality of teeth protruding inward from the stator yoke;
    a coil wound around the teeth, a power wire being drawn out from the coil; and
    a retainer member configured to press a coil end against the stator core, the coil end being a part of the coil, the coil end protruding from an end portion in an axis direction of the stator core, the retainer member including a pressing portion, leg portions and attachment ends, the power wire being drawn out from between the leg portions on opposite sides of the pressing portion, the pressing portion being disposed on an end surface in the axis direction of the coil end and configured to press the coil end to the stator core side, the leg portions bending along the axis direction on an outer peripheral surface side of the coil end from respective end portions on the opposite sides of the pressing portion and extending toward respective attachment portions provided at the stator core, and the attachment ends being provided at the respective leg portions and fixed to the respective attachment portions of the stator core, wherein
    the pressing portion of the retainer member is a flat plate-shaped member that is straight, and respective ones of the leg portions of the retainer member directly extend from each longitudinal end of the flat plate-shaped member.

2. The rotary electric machine stator according to claim 1, wherein
    the retainer member is configured to:
        (i) make each of the attachment ends be fixed to the stator yoke, causing the retainer member between the fixed attachment ends to elastically deform, and
        (ii) press the coil end against the stator core via elastic resilience of the retainer member.

3. The rotary electric machine stator according to claim 1, wherein
    the retainer member and the coil end are fixed to each other via varnish.

4. The rotary electric machine stator according to claim 1, wherein
    the attachment ends of the retainer member are fixed to the respective attachment portions of the stator core at a same end of the stator core, in the axis direction, in which the pressing portion is located.

5. The rotary electric machine stator according to claim 1, wherein the retainer member, as a whole, is located outside an inner peripheral surface side of the coil end in a radial direction of the coil end.

6. The rotary electric machine stator according to claim 1, wherein
the power wire, as a whole, is outside the retainer member.

7. The rotary electric machine stator according to claim 1, wherein
no portion of the retainer member is located on an inner peripheral surface side of the coil end.

8. The rotary electric machine stator according to claim 1, wherein
the retainer member is an insulating resin member.

9. The rotary electric machine stator according to claim 8, wherein
the attachment portions each include a through-hole and include a metal member having a stiffness that is higher than a stiffness of the resin member.

10. The rotary electric machine stator according to claim 1, wherein
the retainer member includes the attachment ends attached to three or more the attachment portions provided at the stator core.

11. The rotary electric machine stator according to claim 10, wherein
the retainer member includes a joined pressing portion, the leg portions, and the attachment ends, the number of the leg portions being three, the number of the attachment ends being three,
the joined pressing portion includes three joining portions that are provided by mutually connecting the three pressing portions,
the three leg portions extends, with the three joining portions as the three end portions, from the three end portions toward the three attachment portions provided at the stator core, respectively, and
the three attachment ends are provided at the three leg portions, respectively.

\* \* \* \* \*